(12) United States Patent
Sandoval et al.

(10) Patent No.: US 8,995,513 B1
(45) Date of Patent: Mar. 31, 2015

(54) SYSTEM AND METHOD FOR TRIGGERING A DEVICE UNDER TEST VIA RF LEAKAGE

(71) Applicant: National Instruments Corporation, Austin, TX (US)

(72) Inventors: Roman R. Sandoval, San Antonio, TX (US); Craig E. Rupp, Ames, IA (US); William G. Reid, Cedar Park, TX (US); Jaffar Shah, Austin, TX (US); Paulo A. Lamas De Anda, San Diego, CA (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 14/076,865

(22) Filed: Nov. 11, 2013

(51) Int. Cl.
*H04B 3/46* (2006.01)
*H04B 17/00* (2006.01)

(52) U.S. Cl.
CPC ................................. *H04B 17/002* (2013.01)
USPC ........................................................ 375/224

(58) Field of Classification Search
USPC .................................................. 375/222, 224
See application file for complete search history.

(56) References Cited

U.S. PATENT DOCUMENTS

2008/0064349 A1*  3/2008  Flask et al. ................. 455/161.2
2013/0087694 A1   4/2013  Creeden et al.

\* cited by examiner

*Primary Examiner* — Vineeta Panwalkar
(74) *Attorney, Agent, or Firm* — Meyertons Hood Kivlin Kowert & Goetzel, P.C.; Jeffrey C. Hood

(57) ABSTRACT

Device and method for outputting a leaked radio frequency (RF) signal useable for triggering devices under test (DUTs). The device may include a vector signal analyzer (VSA) which may also perform the method for triggering DUTs. The VSA may include a first component, configured to generate an RF signal, an input configured to receive RF signals transmitted from DUTs, and a received RF signal conditioning portion, each coupled to an internal switching portion. The VSA may be configured to generate the RF signal via the first component, leak the RF signal from the first component to the internal switching portion, generating a leaked RF signal, route the leaked RF signal to the input, bypassing the received RF signal conditioning portion and output the leaked RF signal which is useable to trigger DUTs via the input.

20 Claims, 6 Drawing Sheets

SYSTEM AND METHOD FOR TRIGGERING A DEVICE UNDER TEST VIA RF LEAKAGE

FIELD OF THE INVENTION

The present invention relates to the field of vector signal analyzers (VSAs), and more particularly to a system and method for triggering one or more devices under test (DUTs) using a leaked radio frequency (RF) signal from the VSA.

DESCRIPTION OF THE RELATED ART

Vector Signal Analyzers (VSAs) typically have the specific purpose of receiving radio frequency (RF) signals from a device under test (DUT). Thus, acting as only a receiver of RF signals from the DUT, VSAs typically perform power, in-phase quadrature (IQ), and/or spectral measurements on the received RF signals. However, a DUT may need to be triggered by an RF signal to enable interrupt-based functionality. For example, the trigger may be used by the chipset of the DUT to start or stop a particular sequence or function, such as transmitting various RF signals or waveforms, to be received or captured, and analyzed by the VSA and a host computer. Thus, since the VSA functions only as a receiver, additional hardware, such as a Vector Signal Generator (VSG) or a local oscillator (LO) source, is necessary to perform the triggering of the DUT. The additional hardware may increase system cost substantially. Additionally, since a direct path exists between the VSA and DUT, the addition of a LO source or a VSG to transmit a RF trigger signal may require an external RF combiner between the transmitting source and the VSA further increasing system cost and system complexity.

SUMMARY OF THE INVENTION

Various embodiments of a system and method for triggering one or more devices under test (DUTs) using a leaked radio frequency (RF) signal from a VSA are described herein.

In one embodiment, a vector signal analyzer (VSA) may include a first component that may be configured to generate a radio frequency (RF) signal. In some embodiments, the RF signal may be a continuous sinusoidal signal while in other embodiments the RF signal may be an arbitrary waveform. In an exemplary embodiment, the first component may include a local oscillator where the local oscillator generates the RF signal. In certain embodiments, the local oscillator may be included in a calibration synthesizer. In one particular embodiment, the local oscillator may be included in a demodulation circuit. In other embodiments, the local oscillator may be included in a downconverting circuit. In such embodiments, the downconverting circuit may include one or more local oscillators, including the local oscillator. Additionally, in other embodiments, the VSA may include a downconverting circuit which may also include a demodulation circuit. In such embodiments, the first component may include a local oscillator in the demodulation circuit, where the local oscillator generates the RF signal. In some embodiments, the downconverting circuit may also include a second component which may include one or more additional local oscillators which generate one or more additional RF signals.

In addition to the first component, the VSA may include an internal switching portion, coupled to the first component, and an input, coupled to the internal switching portion, where the input may be configured to receive RF signals transmitted from DUTs.

The VSA may also include a received RF signal conditioning portion, coupled to the internal switching portion, where the received RF signal conditioning portion may include one or more components. The internal switching portion may be configured to route the received RF signals from the input through the received RF signal conditioning portion. The received RF signal conditioning portion may be configured to condition, via the one or more components, the received RF signals. In some embodiments, the one or more components may include one or more amplifiers. In other embodiments, the one or more components may include one or more static attenuators. In a particular embodiment, the one or more components may include one or more variable attenuators where each of the one or more variable attenuators is configurable to provide reduced attenuation.

In an exemplary embodiment, the VSA may be configured to generate the RF signal via the first component. In certain embodiments in which the VSA may include a downconverting circuit which may include a demodulation circuit, the VSA may be configured to generate the RF signal via the demodulating circuit and generate the one or more additional RF signals via the downconverting circuit.

Additionally, the VSA may be configured to leak the RF signal from the first component to the internal switching portion, thereby generating a leaked RF signal, where power of the leaked RF signal is above a detectable signal threshold of one or more DUTs. In certain embodiments in which the VSA may include a downconverting circuit which may also include a demodulation circuit and an RF signal mixer, the VSA, in order to leak the RF signal from the first component to the internal switching portion, may be further configured to leak the RF signal and at least one of the one or more additional RF signals to the RF signal mixer, and combine, via the RF signal mixer, the RF signal and the at least one of the one or more additional RF signals leaked to the RF signal mixer, thereby generating a combined leaked RF signal, where power of the combined leaked RF signal is above the detectable signal threshold of the one or more DUTs. The VSA may be further configured to leak the combined leaked RF signal to the internal switching portion.

The VSA may also be configured to route, via the internal switching portion, the leaked RF signal to the input, bypassing at least one of the one or more components of the received RF signal conditioning portion, thereby preserving the power of the leaked RF signal above the detectable signal threshold of one or more DUTs. In certain embodiments in which the one or more components of the received RF signal conditioning portion may include one or more variable attenuators, the VSA may be further configured to configure at least one of the one or more variable attenuators for reduced attenuation. Then, in order to route, via the internal switching portion, the leaked RF signal to the input, the VSA may be further configured to route the leaked RF signal through the at least one of the one or more variable attenuators thereby preserving power of the leaked RF signal above the detectable signal threshold of one or more DUTs.

The VSA may be configured to output the leaked RF signal via the input, where the outputted leaked RF signal is useable to trigger one or more DUTs. In some embodiments, the output may be configured to output the RF signal as a conducted signal, whereas in other embodiments, the output may be configured to output the RF signal as an over-the-air signal.

In another embodiment, a method for providing an RF signal useable to trigger one or more DUTs may include providing a vector signal analyzer VSA. The VSA may include any or all of the various embodiments described above in any combination, with or without particular features disclosed, and may perform any of the methods described herein.

In one exemplary embodiment, the VSA may generate the RF signal via the first component, and leak the RF signal from the first component to the internal switching portion, thereby generating a leaked RF signal, where power of the leaked RF signal is above a detectable signal threshold of one or more DUTs. Additionally, the VSA may route, via the internal switching portion, the leaked RF signal to the input, bypassing at least one of the one or more components of the received RF signal conditioning portion, thereby preserving the power of the leaked RF signal above the detectable signal threshold of one or more DUTs, and may output the leaked RF signal via the input, where the outputted leaked RF signal is useable to trigger one or more DUTs.

As noted above, in some embodiments, the VSA may include a demodulating circuit, where the first component is or includes a local oscillator in the demodulating circuit. In another embodiment, the VSA may further include a downconverting circuit, where the first component includes one or more local oscillators in the downconverting circuit. In such an embodiment, the method may further include generating one or more RF signals, including the RF signal, via the one or more local oscillators.

In some embodiments in which the VSA includes a downconverting circuit coupled to the internal switching portion, the downconverting circuit may include an RF signal mixer and a demodulating circuit coupled to the RF signal mixer, where the first component may be or include a first local oscillator in the demodulating circuit. The VSA may further include a second component, where the second component may include one or more second local oscillators configured to generate one or more additional RF signals. In such embodiments, the method may further include the VSA generating the one or more additional RF signals via the downconverting circuit. Additionally, leaking the RF signal from the first component to the internal switching portion may include the VSA leaking the RF signal and at least one of the one or more additional RF signals to the RF signal mixer, combining, via the RF signal mixer, the RF signal and the at least one of the one or more additional RF signals leaked to the RF signal mixer, thereby generating a combined leaked RF signal, and leaking the combined leaked RF signal to the internal switching portion, where power of the combined leaked RF signal is above the detectable signal threshold of one or more DUTs.

As noted above, the one or more components of the received RF signal conditioning portion may include one or more amplifiers. In some embodiments, the one or more components of the received RF signal conditioning portion may include one or more variable attenuators, where each of the one or more variable attenuators may be configurable to provide reduced attenuation. In such embodiments, the method may further include the VSA configuring at least one of the one or more variable attenuators for reduced attenuation. Accordingly, routing the leaked RF signal may include routing, via the internal switching portion, the leaked RF signal through the at least one of the one or more variable attenuators thereby preserving power of the leaked RF signal above a detectable signal threshold of one or more DUTs.

In certain embodiments, the first component may include a calibration synthesizer. In some embodiments, outputting the leaked RF signal via the input may include outputting the RF signal as a conducted signal. In other embodiments, outputting the leaked RF signal via the input may include outputting the RF signal as an over-the-air signal.

BRIEF DESCRIPTION OF THE DRAWINGS

A better understanding of the present invention can be obtained when the following detailed description of the preferred embodiment is considered in conjunction with the following drawings, in which.

Figure 1:
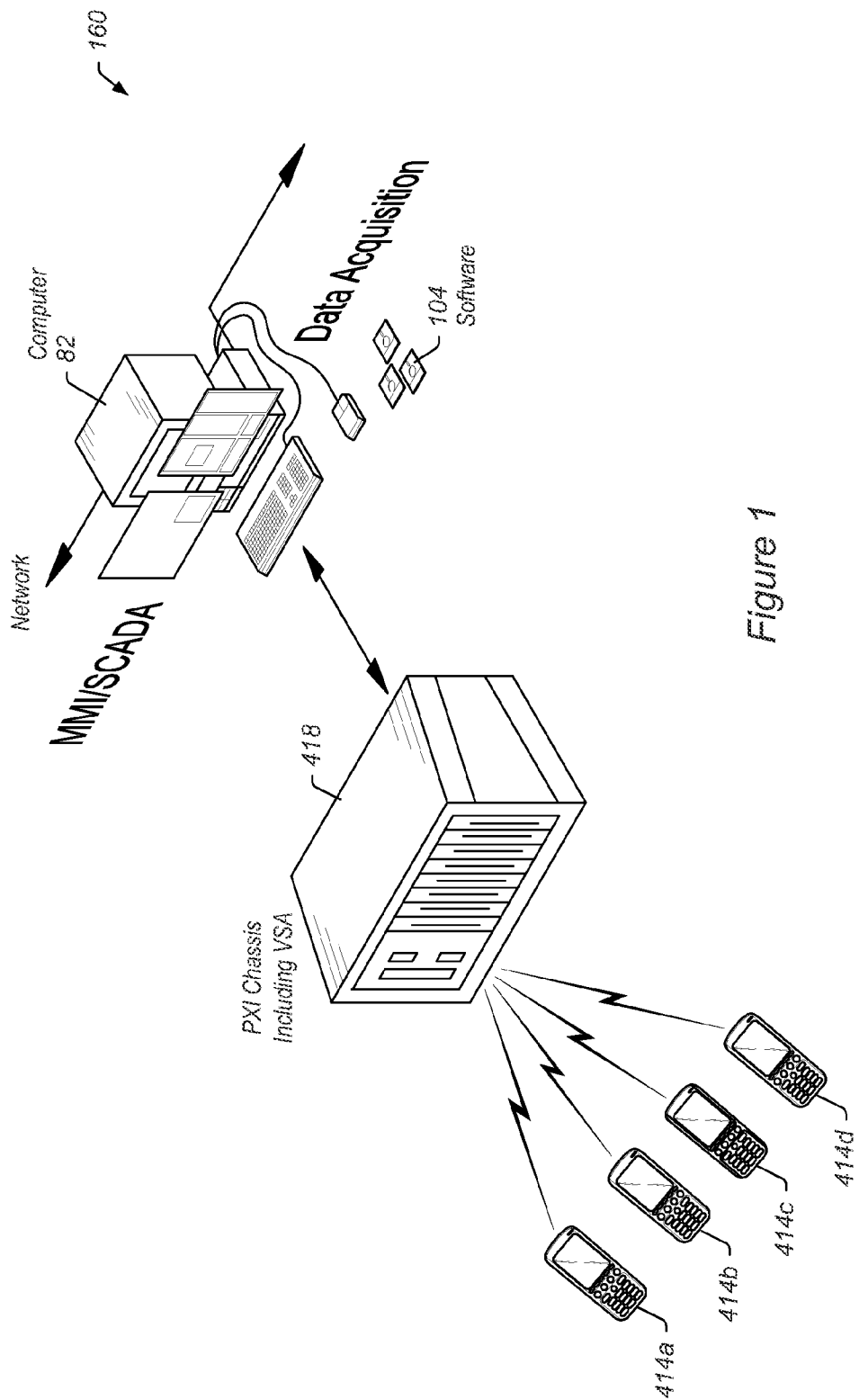
FIG. 1 illustrates a system that may implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Vector Signal Analyzer (VSA)—refers to a device for receiving radio frequency (RF) signals from one or more devices under test (DUTs). As a receiver of RF signals from the DUTs, VSAs typically perform power, in phase quadrature (IQ), and/or spectral measurements on the received RF signals.

Arbitrary Waveform—refers to various types of non-continuous waveforms including digitally modulated waveforms such as amplitude shift keyed (ASK), phase shift keyed (PSK), amplitude-phase shift keyed (APSK), frequency shift keyed (FSK), and multiple frequency shift keyed (MFSK), among others. Additionally, the term refers to variations in the methods for digitally modulating waveforms, such as, for example, differential phase shift keyed (DPSK), binary phase shift keyed (BPSK), and quadrature phase shift keyed (QPSK), among others. The term further encompasses waveforms produced using various methods of digital encoding, such as orthogonal frequency-division multiplexing (OFDM), as well as combinations of digitally encoded and digitally modulated signals, such as, for example, a BPSK OFDM signal.

FIG. 1—RF Test System

FIG. 1 illustrates a radio frequency (RF) test system 160. The vector signal analyzer (VSA) included in PXI chassis 418 may be configured to trigger one or more devices under test (DUTs), such as DUTs 414a-414d using a leaked RF signal as described herein. As shown in FIG. 1, the computer 82 may include a display device and at least one memory medium on which one or more computer programs or software components, such as software 104. The one or more computer programs or software components may be configured to analyze data collected by the PXI chassis 418 via the VSA. For example, the VSA may be configured to generate an RF signal and leak the RF signal to an input of the VSA. Additionally, the VSA may be configured to output the leaked RF signal and trigger one or more of the DUTs 414a-414d as described in more detail below in reference to FIGS. 2-5. In addition, the VSA included in PXI chassis 418 may be configured to perform embodiments of the methods described herein.

Figure 2:
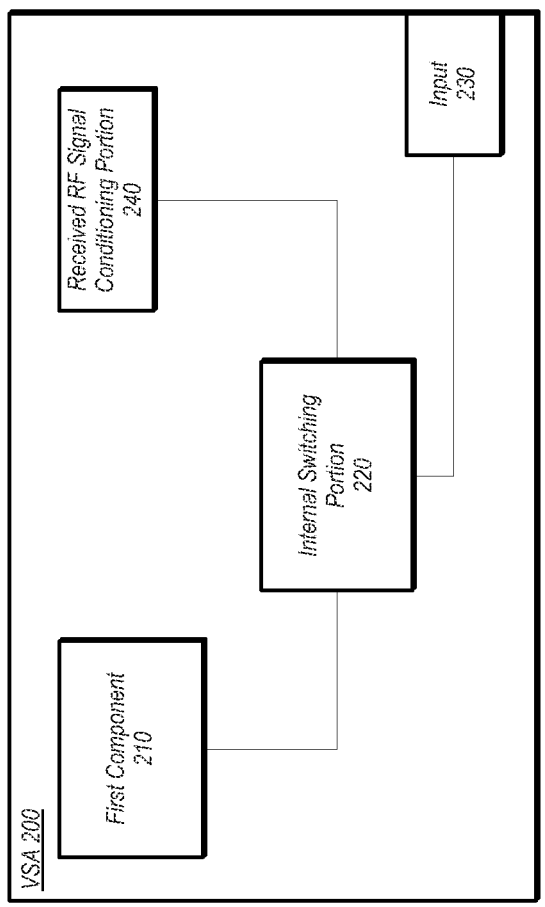
FIG. 2 is an exemplary block diagram of a VSA that may implement an embodiment of the present invention.

FIG. 2—Exemplary Block Diagram of a VSA

FIG. 2 is an exemplary block diagram of a VSA that may implement embodiments of the present invention. In one embodiment, VSA 200 may include a first component 210 which may be configured to generate an RF signal. Additionally, the VSA 200 may include an internal switching portion 220 that may be coupled to the first component 210. The VSA 200 may also include an input 230 that may also be coupled to the internal switching portion 220. The input 230 may be configured to receive RF signals transmitted from DUTs, such as the DUTs 414a-414d of FIG. 1. Further, the VSA 200 may include a received RF signal conditioning portion 240 that may be coupled to the internal switching portion 220 as well. The RF signal conditioning portion 240 may include one or more components for conditioning RF signals received by the input 230. In addition, the RF signal conditioning portion 240 may be configured to condition the received RF signals from the input 230, via the one or more components, where the internal switching portion 220 may be configured to route the received RF signals from the input 230 through the received RF signal conditioning portion 240.

In an exemplary embodiment, the VSA 200 may be configured to generate the RF signal via the first component 210. It should be noted that the first component 210 of VSA 200 may include various (sub)components in order to generate the RF signal. In one embodiment, the first component 210 may include a calibration synthesizer and the RF signal may be generated by the calibration synthesizer. The calibration synthesizer may include a local oscillator or other RF signal generator in order to generate the RF signal. Hence, the first component may include a local oscillator of the calibration synthesizer. Further embodiments of the first component 210 will be discussed below in reference to FIGS. 3-5. It should also be noted that in various embodiments the RF signal generated by the first component may include a continuous sinusoidal signal or an arbitrary waveform. As noted above in the Terms section, the term arbitrary waveform refers to various types of non-continuous waveforms including digitally modulated waveforms such as amplitude shift keyed (ASK), phase shift keyed (PSK), amplitude-phase shift keyed (APSK), frequency shift keyed (FSK), and multiple frequency shift keyed (MFSK), among others. Additionally, the term refers to variations in the methods for digitally modulating waveforms, such as, for example, differential phase shift keyed (DPSK), binary phase shift keyed (BPSK), and quadrature phase shift keyed (QPSK), among others. The term further encompasses waveforms produced using various methods of digital encoding, such as orthogonal frequency-division multiplexing (OFDM), as well as combinations of digitally encoded and digitally modulated signals, such as, for example, a BPSK OFDM signal.

Additionally, the VSA 200 may be configured to leak the RF signal from the first component 210 to the internal switching portion 220. It should be noted that the power of the leaked RF signal is at or above a detectable signal threshold of one or more DUTs, such as the DUTs 414a-414d. In other words, the power of the leaked RF signal must be greater than or equal to the smallest signal power that can be received by an RF receiver, processed by its conversion chain and demodulated, and be usable by the RF receiver at the demodulator output. The detectable signal threshold is also known as the noise floor of a system and can be mathematically defined or specified, e.g., as −174 dBm/Hz times bandwidth, where dBm is the power ratio in decibels of the measured power referenced to one miliwatt.

The VSA 200 may be further configured to route, via the internal switching portion 220, the leaked RF signal to the input 230, bypassing at least one of the one or more components that may be included in the received RF signal conditioning portion 240. Note that bypassing the one or more components that may be included in the received RF signal conditioning portion 240 preserves the power of the leaked RF signal above the detectable signal threshold of one or more DUTs. In some embodiments, the one or more components of the received RF signal conditioning portion may include one or more amplifiers, where the amplifiers amplify the RF signals received by the input 230. It should be noted that allowing the leaked RF signal to pass through the one or more amplifiers may result in the reverse isolation of the leaked RF signal. Reverse isolation of the leaked RF signal may lower the power of the RF signal below the detectable signal threshold of one or more DUTs.

In certain embodiments, the one or more components of the received RF signal conditioning portion 240 may include one or more variable attenuators that may be configurable to provide reduced attenuation. In such embodiments, the VSA 200 may be configured to configure at least one of the one or more variable attenuators for reduced attenuation. Additionally, in order to route the leaked RF signal to the input 230 via the internal switching portion 220, the VSA 200 may be configured to route the leaked RF signal through the at least one of the one or more variable attenuators. In such instances, the power of the leaked RF signal is preserved above the detectable signal threshold of one or more DUTs because the at least one of the one or more variable attenuators is set for reduced attenuation. In other embodiments, the one or more components of the received RF signal conditioning portion 240 may include one or more static attenuators. It should be noted that the route of the leaked RF signal, whether the one or more components of the received RF signal conditioning portion includes one or more amplifiers, one or more variable attenuators, one or more static attenuators, or any combination thereof, must be such that the power of the leaked RF signal is preserved above the detectable signal threshold of one or more DUTs. Further, the VSA 200 may include additional amplifiers, variable attenuators, or static attenuators, or any combination thereof, which may not be included in the received RF signal conditioning portion, but may be in another portion of the VSA 200. Thus, the route of the leaked RF signal, whether the leaked RF signal bypasses the received RF signal conditioning portion or is routed through the received RF signal conditioning portion, may include one or more static attenuators and/or one or more variable attenuators configured at various attenuation levels so long as the power of the RF signal is preserved above the detectable signal threshold of one or more DUTs.

Further, the VSA 200 may be configured to output the leaked RF signal via the input 230. It should be noted that the internal switching portion 220 may route the leaked RF signal such that it bypasses the received RF signal conditioning portion 240 or, in some embodiments, route the leaked RF signal through the received RF signal condition portion 240. In some embodiments, the output 230 may be configured to output the leaked RF signal as a conducted signal. In other embodiments, the output 230 may be configured to output the leaked RF signal as an over-the-air signal. In all embodiments, the outputted leaked RF signal is useable to trigger one or more DUTs.

Exemplary Vector Signal Analyzers

Figure 3:
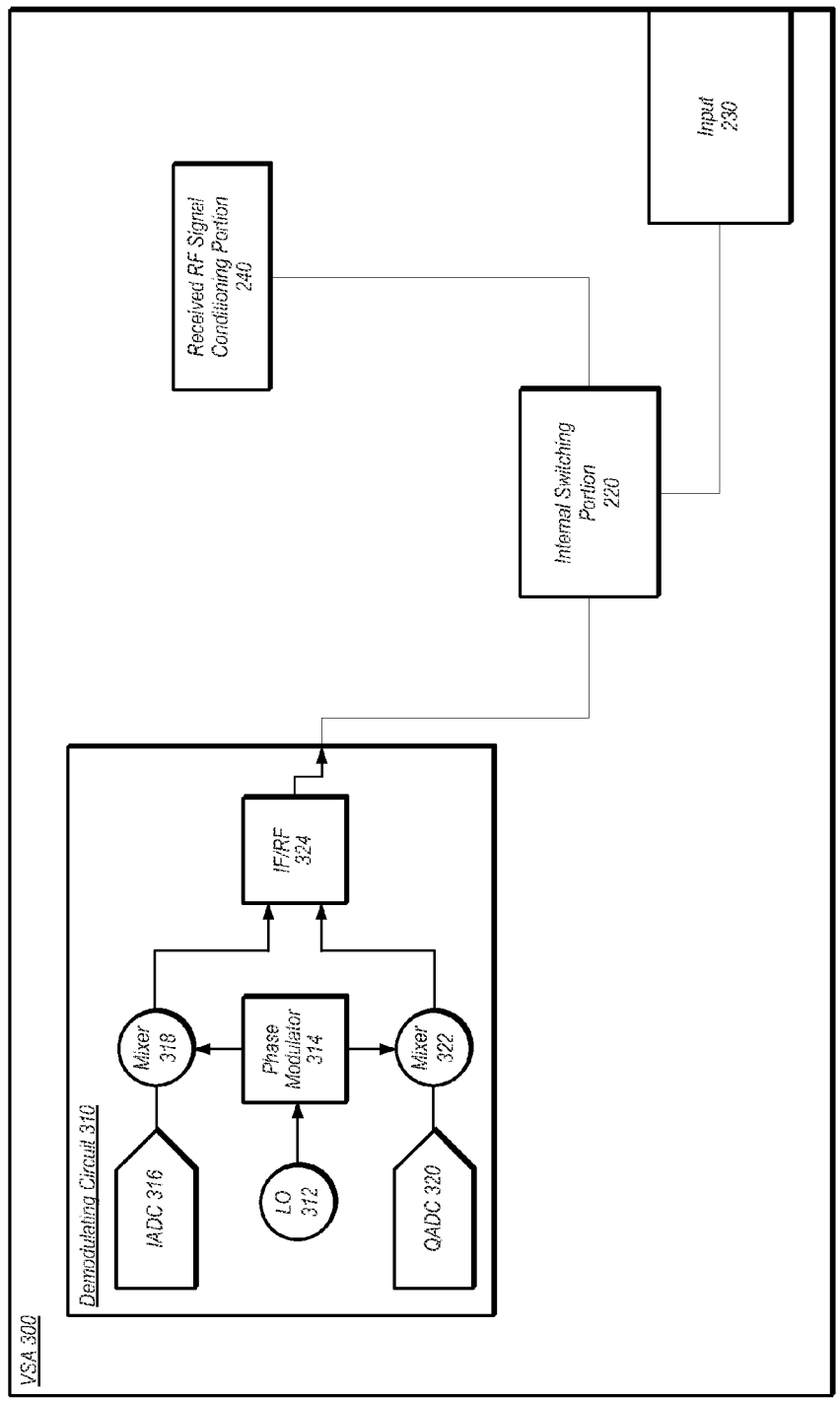
FIG. 3 is a block diagram of a VSA Homodyne Architecture that may implement an embodiment of the present invention.
Figure 4:
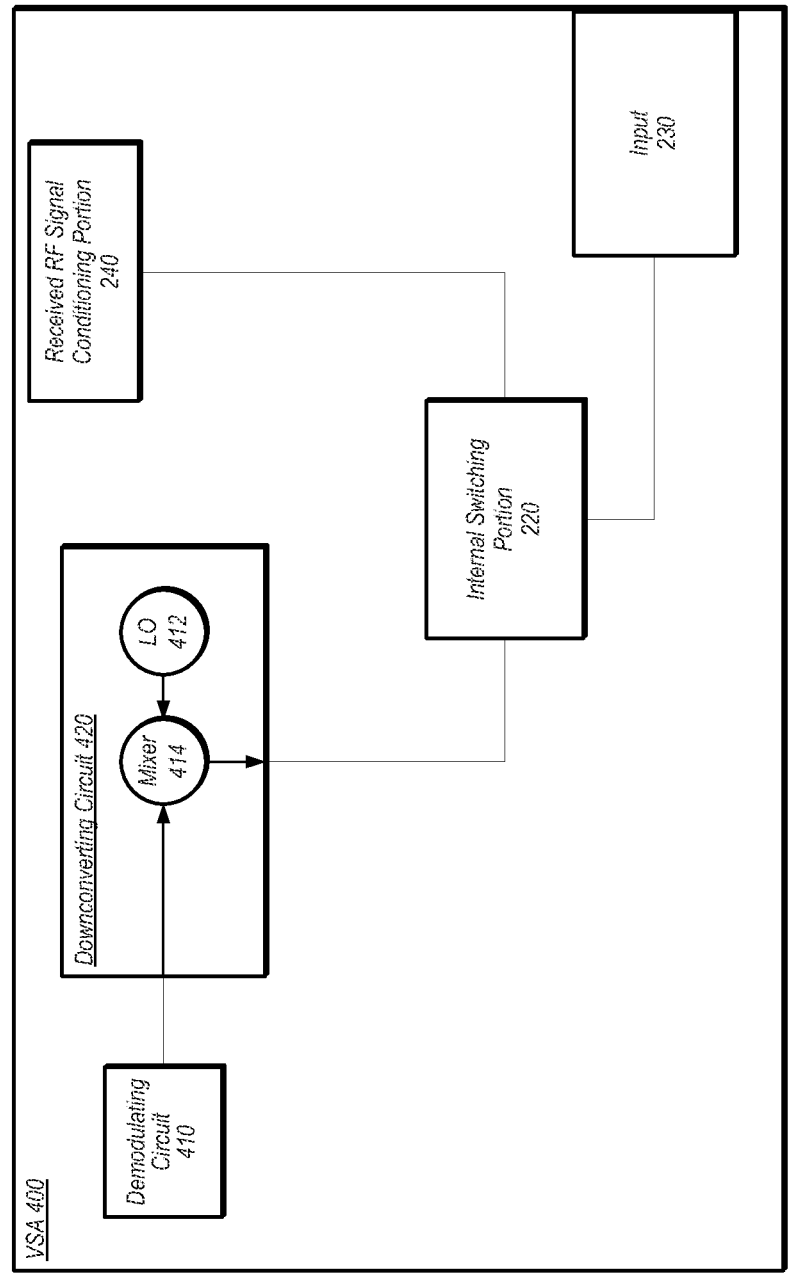
FIG. 4 is a block diagram of a VSA Super-Heterodyne Architecture that may implement an embodiment of the present invention.
Figure 5:
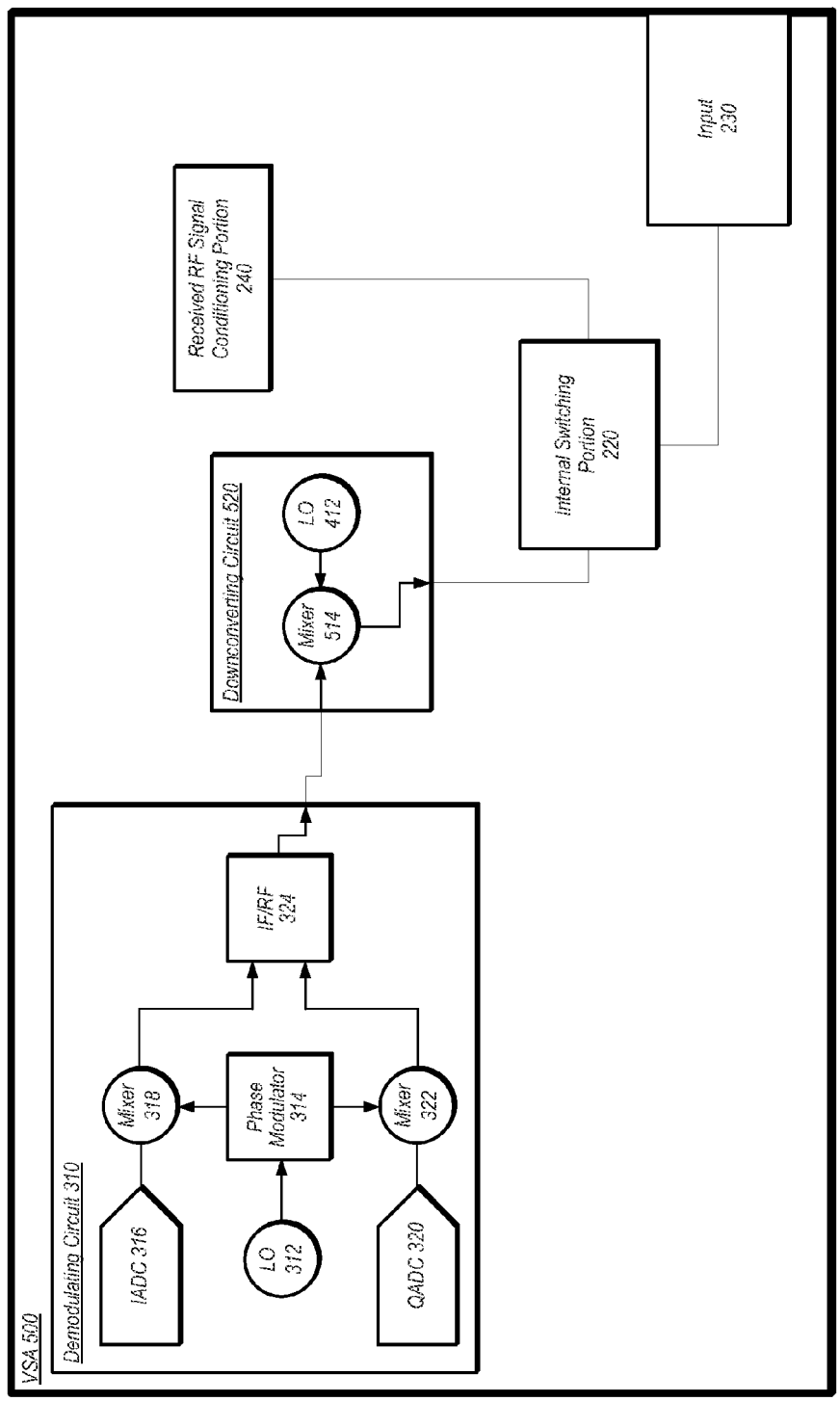
FIG. 5 is a block diagram of a VSA Super-Heterodyne Architecture that may implement an embodiment of the present invention.

FIG. 3 through FIG. 5 further describe exemplary embodiments of a VSA for triggering one or more DUTs using an RF signal leaked from the VSA. The embodiments described herein are for explanation purposes only and are in no way intended to limit the scope of the present invention to any particular form, function, or appearance. Additionally, the embodiments described above in reference to FIGS. 1 and 2 as well as the particular embodiments described below in reference to FIGS. 3, 4, and 5 may all be used to implement the methods described below in reference to FIG. 6.

FIG. 3 is an exemplary block diagram of a VSA homodyne architecture. It should be noted that blocks with similar or the same functionality as described above with reference to FIG. 2 are labeled accordingly. Hence, internal switching portion 220 of FIG. 3 has the same or similar functionality as described above with reference to FIG. 2. Similarly, input 230 and received RF signal conditioning portion 240 also have the same or similar functionality as described above in reference to FIG. 2. Additionally, any embodiments discussed in reference to internal switching portion 220, input 230, and received RF signal conditioning portion 240 apply equally with respect to VSA 300.

In some embodiments, VSA 300 may include a demodulating circuit 310. The demodulating circuit 310 may include a local oscillator 312, where the local oscillator (LO) 312 is configured to generate the RF signal as described above in reference to the first component 210 of VSA 200 of FIG. 2. The RF signal generated by the local oscillator 312 enters a phase modulator 314 which splits the RF signal into two resultant waveforms, one that has a zero degree phase offset and one that has a ninety degree phase offset. The resultant waveform with the ninety degree phase offset enters an in-phase mixer 318 and is mixed with an in-phase signal generated by in-phase analog to digital converter (ADC) 316 and is then leaked to the intermediate frequency-radio frequency (IF/RF) combiner 324. The resultant waveform with the zero degree phase offset enters a quadrature phase mixer 322 and is mixed with a quadrature-phase signal generated by quadrature-phase ADC 320 and is then leaked to the IF/RF combiner 324. From the IF/RF combiner 324, the RF signal, now split and remixed, is leaked to the internal switching portion 220.

FIG. 4 is an exemplary block diagram of a VSA superheterodyne architecture. It should be noted that blocks with similar or the same functionality as described above with reference to FIG. 2 are labeled accordingly. Hence, internal switching portion 220 of FIG. 4 has the same or similar functionality as described above with reference to FIG. 2. Similarly, input 230 and received RF signal conditioning portion 240 also have the same or similar functionality as described above in reference to FIG. 2. Additionally, any embodiments discussed in reference to internal switching portion 220, input 230, and received RF signal conditioning portion 240 apply equally with respect to VSA 400.

In some embodiments, VSA 400 may include a downconverting circuit 420. In one embodiment, downconverting circuit 420 may include a local oscillator 412, where the local oscillator 412 is configured to generate the RF signal as described above in reference to the first component 210 of VSA 200 of FIG. 2, and a signal mixer 414. Additionally, in some embodiments, the downconverting circuit 420 may include a demodulating circuit 410, also coupled to the signal mixer 414. In certain embodiments, downconverting circuit 420 may also include one or more oscillators, where the one or more local oscillators are configured to generate one or more RF signals including the RF signal as described above in reference to the first component 210 of VSA 200 of FIG. 2. Once the local oscillator 412 generates the RF signal, the RF signal enters the signal mixer 414 and is leaked to the internal switching portion 220.

FIG. 5 is another exemplary block diagram of a VSA superheterodyne architecture. It should be noted that blocks with similar or the same functionality as described above with reference to FIG. 2 are labeled accordingly. Hence, internal switching portion 220 of FIG. 5 has the same or similar functionality as described above with reference to FIG. 2. Similarly, input 230 and received RF signal conditioning portion 240 also have the same or similar functionality as described above in reference to FIG. 2. Additionally, any embodiments discussed in reference to internal switching portion 220, input 230, and received RF signal conditioning portion 240 apply equally with respect to VSA 500. Also, for simplicity, blocks of VSA 500 with the similar or same functionality as described above in reference to VSA 300 of FIG. 3 and VSA 400 of FIG. 4 are labeled accordingly. Thus, demodulating circuit 310 has the same components and functionality as described above in reference to FIG. 3.

In some embodiments, demodulating circuit 310 may include a first component that includes local oscillator 312 and generates the RF signal. Additionally, demodulating circuit 310 may be included in downconverting circuit 520 and coupled to RF signal mixer 514, where the VSA 500 may be configured to leak the RF signal to RF signal mixer 514. Downconverting circuit 520 may be similar to downconverting circuit 420 as described in reference to FIG. 4. In some embodiments, downconverting circuit 520 may also include a second component which may include one or more local oscillators, such as local oscillator 412. The one or more local oscillators may be configured to generate one or more additional RF signals. Thus, in some embodiments, the VSA 500 may be configured to generate the RF signal via demodulating circuit 310 and generate the one or more additional RF signals via downconverting circuit 520. In such embodiments, the VSA 500, in order to leak the RF signal from the first component, e.g., local oscillator 312, to the internal switching portion 220, may be configured to leak the RF signal, e.g., the RF signal generated via local oscillator 312, and at least one of the one or more additional RF signals, e.g., at least one of the one or more additional RF signals generated via the one or more local oscillators of downconverting circuit 520, to the RF signal mixer 514. Further, the VSA 500 may be configured to combine, via the RF signal mixer 514, the RF signal and the at least one of the one or more additional RF signals leaked to the RF signal mixer 514, thus generating a combined leaked RF signal. Note that the power of the combined leaked RF signal is above the detectable signal threshold of one or more DUTs. Finally, the VSA 500 may be configured to leak the combined leaked RF signal to the internal switching portion 220.

Figure 6:
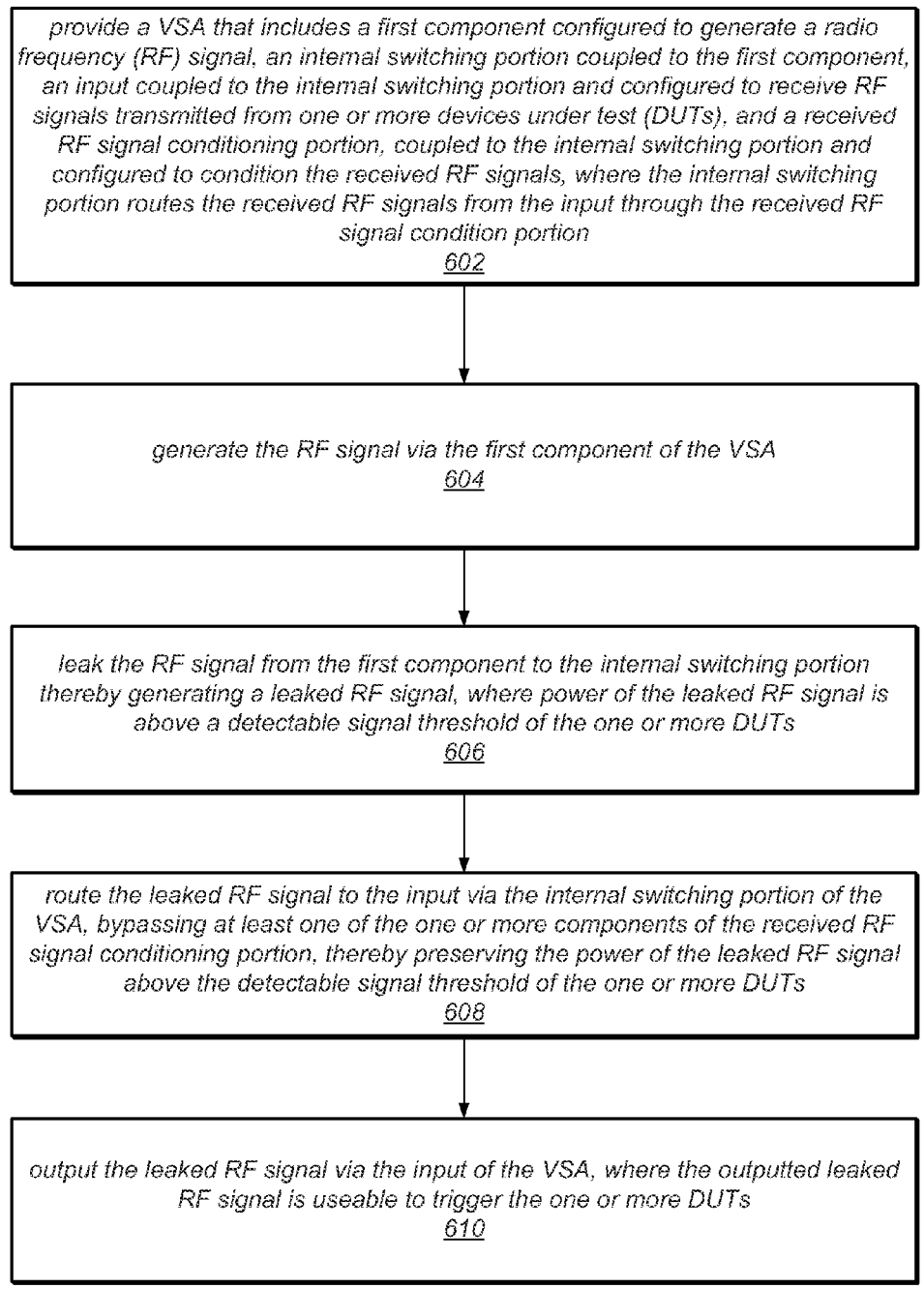
FIG. 6 is a flowchart diagram illustrating one embodiment of a method for using a leaked RF signal to trigger one or more DUTs.

FIG. 6—Flowchart of a Method for Providing an RF Signal for Triggering DUTs

FIG. 6 illustrates a method for providing an RF signal useable to trigger one or more DUTs, according to one embodiment. The method shown in FIG. 6 may be used in conjunction with any of the systems or devices shown in the above figures, among other devices. In various embodiments, some of the method elements shown may be performed concurrently, in a different order than shown, or may be omitted. Additional method elements may also be performed as desired. As shown, this method may operate as follows.

First, in 602 a VSA, such as, for example, VSA 200, VSA 300, VSA 400, or VSA 500, may be provided. In an exemplary embodiment, the VSA may include a first component configured to generate an RF signal. In some embodiments, the VSA may include a demodulating circuit, such as demodulating circuit 310 described above, where the first component may include a local oscillator of the demodulating circuit. In other embodiments, the VSA may include a downconverting circuit, such as downconverting circuit 420 described above, where the first component may include one or more local oscillators in the downconverting circuit. Additionally, the VSA may include an internal switching portion, such as internal switching portion 220 described above, coupled to the first component and an input, such as input 230 described above, coupled to the internal switching portion. In some embodiments, the input may be configured to receive RF signals transmitted from one or more DUTs. Further, the VSA may include a received RF signal conditioning portion, such as received RF signal conditioning portion 240 described above, coupled to the internal switching portion. In certain embodiments, the received RF signal conditioning portion may be configured to condition the received RF signals where the internal switching portion may route the received RF signals from the input through the received RF signal conditioning portion.

In 604, the VSA may generate the RF signal via the first component. In some embodiments, as mentioned above, the first component may include a local oscillator and the RF signal may be generated via the local oscillator. In embodiments where the first component may include one or more local oscillators, the method may further include generating one or more RF signals, including the RF signal, via the one or more local oscillators. In some embodiments, the first component may include a calibration synthesizer where the calibration synthesizer may include a local oscillator and the method may include generating the RF signal via the local oscillator of the calibration synthesizer.

In 606, the VSA may leak the RF signal from the first component to the internal switching portion, thereby generating a leaked RF signal. It should be noted that power of the leaked RF signal is above a detectable signal threshold of one or more DUTs.

In 608, the VSA may route, via the internal switching portion, the leaked RF signal to the input, bypassing at least one of the one or more components of the received RF signal conditioning portion and preserving the power of the leaked RF signal above the detectable signal threshold of the one or more DUTs. In some embodiments, the one or more components of the received RF signal conditioning portion may include one or more amplifiers. In other embodiments, the one or more components of the received RF signal conditioning portion may include one or more static attenuators. In certain embodiments, the one or more components of the received RF signal conditioning portion may include one or more variable attenuators where each of the one or more variable attenuators may be configurable for reduced attenuation. Additionally, in such an embodiment, the method may further include the VSA configuring at least one of the one or more variable attenuators for reduced attenuation, and routing, via the internal switching portion, the leaked RF signal through the at least one of the one or more variable attenuators, thus preserving power of the leaked RF signal above a detectable signal threshold of the one or more DUTs.

In 610, the VSA may output the leaked RF signal via the input where the outputted leaked RF signal is useable to trigger one or more DUTs. In some embodiments, outputting the leaked RF signal via the input may further include the VSA outputting the RF signal as a conducted signal. In other embodiments, outputting the leaked RF signal via the input may include the VSA outputting the RF signal as an over-the-air signal.

In an exemplary embodiment, the VSA may include a downconverting circuit coupled to the internal switching portion. In such embodiments, the downconverting circuit may include an RF signal mixer, a demodulating circuit coupled to the RF signal mixer, and a second component. Further, the first component may include a local oscillator in the demodulating circuit. Additionally, the second component may include one or more additional oscillators which may be configured to generate one or more additional RF signals. The method may further include the VSA generating the one or more additional RF signals via the downconverting circuit. In addition, leaking the RF signal from the first component to the internal switching portion may include the VSA leaking the RF signal and at least one of the one or more additional RF signals to the RF signal mixer. Also, the VSA may combine, via the RF signal mixer, the RF signal and the at least one of the one or more additional RF signals leaked to the RF signal mixer resulting in the VSA generating a combined leaked RF signal. The power of the combined leaked RF signal is above the detectable signal threshold of the one or more DUTs. Thus, leaking the RF signal from the first component to the internal switching portion may further include the VSA leaking the combined leaked RF signal to the internal switching portion. Accordingly, the combined leaked RF signal may be useable to trigger the one or more DUTs.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A vector signal analyzer (VSA), comprising:
a first component, configured to generate a radio frequency (RF) signal;
an internal switching portion, coupled to the first component;
an input, coupled to the internal switching portion, wherein the input is configured to receive RF signals transmitted from devices under test (DUTs); and
a received RF signal conditioning portion, coupled to the internal switching portion, wherein the received RF signal conditioning portion comprises one or more components, wherein the received RF signal conditioning portion is configured to condition, via the one or more components, the received RF signals, and wherein the internal switching portion is configured to route the received RF signals from the input through the received RF signal conditioning portion;
wherein the VSA is configured to:
generate the RF signal via the first component;
leak the RF signal from the first component to the internal switching portion, thereby generating a leaked RF signal, wherein power of the leaked RF signal is above a detectable signal threshold of one or more DUTs;
route, via the internal switching portion, the leaked RF signal to the input, bypassing at least one of the one or more components of the received RF signal conditioning portion, thereby preserving the power of the leaked RF signal above the detectable signal threshold of the one or more DUTs; and
output the leaked RF signal via the input, wherein the outputted leaked RF signal is useable to trigger the one or more DUTs.

2. The VSA of claim 1, further comprising:
a demodulating circuit, wherein the first component comprises a local oscillator in the demodulating circuit.

3. The VSA of claim 1, further comprising:
a downconverting circuit, wherein the first component comprises one or more local oscillators in the downconverting circuit, and wherein the one or more local oscillators are configured to generate one or more RF signals, including the RF signal.

4. The VSA of claim 1, further comprising:
a downconverting circuit coupled to the internal switching portion, wherein the downconverting circuit comprises:
an RF signal mixer;
a demodulating circuit coupled to the RF signal mixer, wherein the first component comprises a first local oscillator in the demodulating circuit, and wherein the first local oscillator is configured to generate the RF signal; and
a second component, wherein the second component comprises one or more second local oscillators, wherein the one or more second local oscillators are configured to generate one or more additional RF signals;

wherein the VSA is further configured to:
generate the RF signal via the demodulating circuit;
generate the one or more additional RF signals via the downconverting circuit; and wherein to leak the RF signal from the first component to the internal switching portion, the VSA is configured to:
leak the RF signal and at least one of the one or more additional RF signals to the RF signal mixer;
combine, via the RF signal mixer, the RF signal and the at least one of the one or more additional RF signals leaked to the RF signal mixer, thereby generating a combined leaked RF signal, wherein power of the combined leaked RF signal is above the detectable signal threshold of the one or more DUTs; and
leak the combined leaked RF signal to the internal switching portion.

5. The VSA of claim 1, wherein the one or more components of the received RF signal conditioning portion comprise:
one or more amplifiers.

6. The VSA of claim 1, wherein the received RF signal conditioning portion comprises one or more variable attenuators, wherein each of the one or more variable attenuators is configurable to provide reduced attenuation.

7. The VSA of claim 6, wherein the VSA is further configured to:
configure at least one of the one or more variable attenuators for reduced attenuation; and
wherein to route, via the internal switching portion, the leaked RF signal to the input, the VSA is configured to:
route the leaked RF signal through the at least one of the one or more variable attenuators thereby preserving power of the leaked RF signal above the detectable signal threshold of the one or more DUTs.

8. The VSA of claim 1, wherein the first component comprises:
a calibration synthesizer.

9. The VSA of claim 1, wherein the output is configured to:
output the RF signal as a conducted signal.

10. The VSA of claim 1, wherein the output is configured to:
output the RF signal as an over-the-air signal.

11. A method for providing a radio frequency (RF) signal useable to trigger one or more devices under test (DUTs), the method comprising:
providing a vector signal analyzer (VSA), wherein the VSA comprises:
a first component, configured to generate a radio frequency (RF) signal;
an internal switching portion, coupled to the first component;
an input, coupled to the internal switching portion, wherein the input is configured to receive RF signals transmitted from the one or more DUTs; and
a received RF signal conditioning portion, coupled to the internal switching portion, wherein the received RF signal conditioning portion comprises one or more components, wherein the received RF signal conditioning portion is configured to condition, via the one or more components, the received RF signals, and wherein the internal switching portion is configured to route the received RF signals from the input through the received RF signal conditioning portion; and the VSA performing:
generating the RF signal via the first component;
leaking the RF signal from the first component to the internal switching portion, thereby generating a leaked RF signal, wherein power of the leaked RF signal is above a detectable signal threshold of the one or more DUTs;
routing, via the internal switching portion, the leaked RF signal to the input, bypassing at least one of the one or more components of the received RF signal conditioning portion, thereby preserving the power of the leaked RF signal above the detectable signal threshold of the one or more DUTs; and
outputting the leaked RF signal via the input, wherein the outputted leaked RF signal is useable to trigger the one or more DUTs.

12. The method of claim 11, wherein the VSA further comprises:
a demodulating circuit, wherein the first component comprises a local oscillator in the demodulating circuit.

13. The method of claim 11, wherein the VSA further comprises:
a downconverting circuit, wherein the first component comprises one or more local oscillators in the downconverting circuit, the method further comprising:
generating one or more RF signals, including the RF signal, via the one or more local oscillators.

14. The method of claim 11, wherein the VSA further comprises:
a downconverting circuit coupled to the internal switching portion, wherein the downconverting circuit comprises:
an RF signal mixer;
a demodulating circuit coupled to the RF signal mixer, wherein the first component comprises a first local oscillator in the demodulating circuit; and
a second component, wherein the second component comprises one or more second local oscillators, wherein the one or more second local oscillators are configured to generate one or more additional RF signals;

wherein the method further comprises:
the VSA performing:
generating the one or more additional RF signals via the downconverting circuit; and
wherein said leaking the RF signal from the first component to the internal switching portion comprises:
the VSA performing:
leaking the RF signal and at least one of the one or more additional RF signals to the RF signal mixer;
combining, via the RF signal mixer, the RF signal and the at least one of the one or more additional RF signals leaked to the RF signal mixer, thereby generating a combined leaked RF signal, wherein power of the combined leaked RF signal is above the detectable signal threshold of the one or more DUTs; and
leaking the combined leaked RF signal to the internal switching portion.

15. The method of claim 11, wherein the one or more components of the received RF signal conditioning portion comprise:
one or more amplifiers.

16. The method of claim 11, wherein the one or more components of the received RF signal conditioning portion comprise:

one or more variable attenuators, wherein each of the one or more variable attenuators is configurable to provide reduced attenuation.

17. The method of claim 16, the method further comprising:
the VSA performing:
configuring at least one of the one or more variable attenuators for reduced attenuation;
wherein said routing comprises:
routing, via the internal switching portion, the leaked RF signal through the at least one of the one or more variable attenuators thereby preserving power of the leaked RF signal above a detectable signal threshold of the one or more DUTs.

18. The method of claim 11, wherein the first component comprises:
a calibration synthesizer.

19. The method of claim 11, wherein said outputting the leaked RF signal via the input comprises:
outputting the RF signal as a conducted signal.

20. The method of claim 11, wherein said outputting the leaked RF signal via the input comprises:
outputting the RF signal as an over-the-air signal.

* * * * *